March 13, 1951  F. F. MATTMANN  2,545,001
SELF-CLEANING RAKE
Filed March 9, 1950

INVENTOR.
Frank F. Mattmann

Patented Mar. 13, 1951

2,545,001

UNITED STATES PATENT OFFICE 2,545,001

SELF-CLEANING RAKE

Frank F. Mattmann, North Bergen, N. J.

Application March 9, 1950, Serial No. 148,642

4 Claims. (Cl. 56—400.08)

1

This invention relates to new and useful improvements in a self cleaning rake, and more particularly to simple and efficient cleaning means that will operate in an extremely reliable and efficient manner to quickly strip the rake of leaves, refuse or other foreign matter which may adhere to the teeth or be wedged between the teeth, making it unnecessary to use the hands to clean the teeth.

Another object of the invention is to provide a rake tooth cleaner which is so constructed as to be readily attached to and detached from rakes of various forms and which may be made of any material, cast, pressed or machined and of suitable size to fit any rake, at a very low cost of production.

Another object of the invention is to provide novel means for quickly cleaning the teeth of a rake, which consists of a stripping bar, metal arm bars connecting the stripping bar to a clamp on the rake handle, a spring for keeping the stripping bar near the head of the rake, and a guard for guiding the stripping bar with respect to the rake, for preventing the rake tooth cleaner from disassembling itself from the rake and for engaging the ground when the rake is inverted and pressed against the ground to move the stripping bar to clean the rake.

Another object of the invention is to provide a rake tooth cleaner whose parts are arranged in a novel manner so that the rake may be operated in the usual manner without being interfered with but which can be readily operated to clean the teeth.

The above and additional objects are accomplished by such means as are shown in the accompanying drawings, described in the following specification and then more particularly pointed out in the claims.

Figure 1:
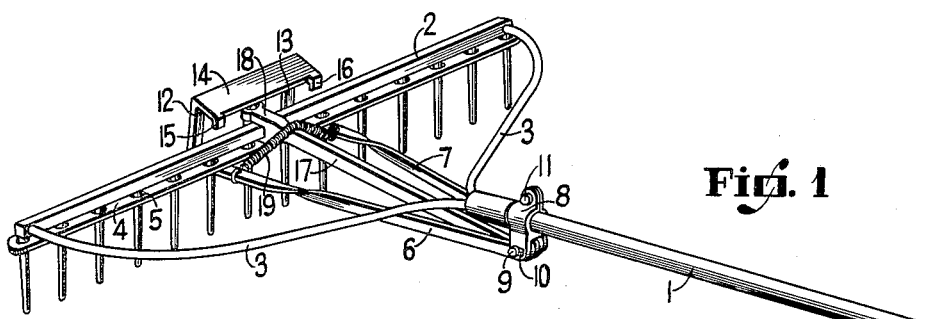
Fig. 1 is a perspective view of my self cleaning rake.
Figure 2:
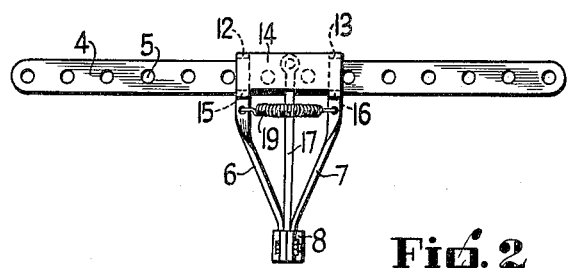
Fig. 2 is a plan view of my rake tooth cleaner detached from a rake.

In the drawings a common type of rake is shown, having the usual handle 1, rake head 2, and rake head supporting rods 3. The rake tooth cleaner includes rake cleaning bar 4. This rake

2 cleaning bar is a light metal bar having openings 5 for the rake teeth to pass through. These openings may be circular, square or other shapes. This cleaning bar is secured to metal arm bars 6 and 7 in some way such as by spot welding. The other ends of the metal arm bars are secured to clamp 8, by a pivotal connection such as by a bolt 9 which passes through holes in the clamp and in the metal arm bars. The hole in one of these members such as the hole 10 in the clamp is elongated or oblong. These elongated openings give the cleaning bar more freedom to travel, which freedom to travel is especially useful in connection with some rakes having curved teeth. The metal arm bars are shown as flat strips of metal which may be spot welded to the cleaning bar and then twisted one half turn so that the ends at the clamp will be in vertical positions to line up with the clamp. The other end of clamp 8 is secured by a bolt or rivet 11. The metal arm bars 6 and 7 are bent at substantially right angles to form guide bars 12 and 13. As an alternative construction the guide bars may be separate pieces, secured to the metal arm bars 6 and 7 and secured to the rake cleaning bar 4, in some way as by spot welding. The guide bars 12 and 13 are connected by connecting bar 14. At the unattached edge of connecting bar 14, are lugs 15 and 16. The cleaning bar 4 and connecting bar 14 are spaced a distance which will limit the movement of the cleaning bar to a distance slightly less than the length of the rake teeth. This prevents the rake tooth cleaner from dismantling itself from the rake. Elements 12, 13 and 14 may be referred to as a guard since among other things, they guard against dismantling of the self cleaning rake. The lugs 15 and 16 are important since they keep the guard from sliding off the head of the rake.

The device also includes an extra center bar 17. One end of this extra center bar is pivoted to the clamp 8 since bolt 9 also passes through a hole in the end of the extra center bar. The other end of the extra center bar is clamped to the center of the head 2 of the rake by means of U-shaped clamp 18. Coil spring 19 is connected to metal arm bars 6 and 7 at the ends of spring 19 and the middle of spring 19 passes over center bar 17. The purpose of spring 19 and center bar 17 is to normally bias the cleaning bar 4 to a position near the rake head.

Figures 3, 4:
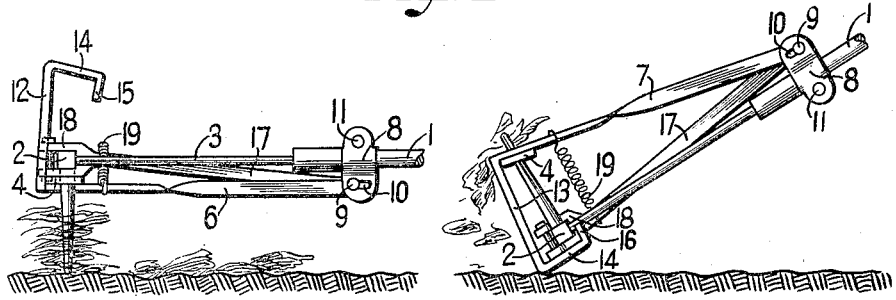
Fig. 3 is a side view of the self cleaning rake of Fig. 1.
Fig. 4 is a side view of my self cleaning rake in inverted position, pressed against the ground.
Figure 5:
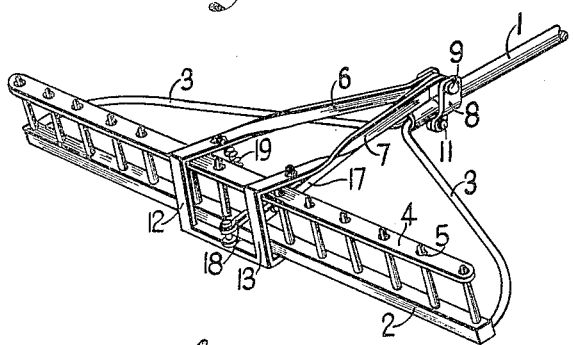
Fig. 5 is a perspective view of my self cleaning rake, in inverted position, pressed against the ground.

In operation, the parts are normally in the position shown in Figs. 1 and 3, and the rake can be used in the usual way. Whenever the rake needs cleaning it can be inverted and connecting bar 14 pressed against the ground or tapped against the ground. This will move the parts to the positions shown in Figs. 4 and 5, cleaning the rake. When the rake is again inverted, the parts will return to the positions shown in Figs. 1 and 3, and raking can be resumed.

In practice, I have found that the form of my invention illustrated in the drawings and referred to in the above description, is the most efficient and practical, but various minor changes in details of construction, proportions and arrangements of the parts may be resorted to when desired, without departing from my invention.

Having thus described my invention, what I claim and desire to secure by Letters Patent is:

1. A self cleaning rake including the usual rake head, rake teeth, rake handle and rake head supporting rods connecting the ends of the rake head to the rake handle, a clamp clamped about the rake handle, two metal arm bars, means pivotally securing one end of each metal arm bar to said clamp, a rake cleaning bar which is substantially the same length as the rake head, the rake cleaning bar having apertures through which the rake teeth pass, means securing the metal arm bars to the rake cleaning bar at spaced points, a guard extending from the rake cleaning bar in a direction substantially parallel to the rake teeth to a point beyond the rake head, a center bar, means pivotally securing one end of the center bar to the clamp, means securing the other end of the center bar to the rake head at a point substantially midway between the metal arm bars, and a coil spring having one end secured to each metal arm bar and the center of the spring passing around the center bar.

2. The self cleaning rake of claim 1 in which the pivotal connections include oblong openings to give the cleaning bar freedom of movement to cooperate with curved rake teeth.

3. The self cleaning rake of claim 1 in which the guard has a portion extending over and spaced from the rake head and lugs extending substantially parallel to the rake teeth and towards the metal arm bars.

4. A rake tooth cleaner comprising an elongated rake cleaning bar having apertures to accommodate rake teeth, clamping means constructed to clamp about a rake handle, two metal arm bars, means securing one end of each metal arm bar to said clamping means, means securing the metal arm bars to spaced points of the rake cleaning bar, a guard secured to an edge of the rake cleaning bar and extending in a direction substantially at right angles to the metal arm bars and a coiled spring having its ends secured respectively to the metal arm bars.

FRANK F. MATTMANN.

No references cited.